Jan. 7, 1964 B. GOLDBERG 3,117,305

FREQUENCY SHIFT TRANSMISSION SYSTEM

Filed Dec. 2, 1960

3 Sheets-Sheet 1

INVENTOR,
BERNARD GOLDBERG

BY Harry M. Saragovitz

ATTORNEY,

PRIOR ART MULTIPATH EFFECT

*INVENTOR,*
BERNARD GOLDBERG
*BY* Harry M. Saragovitz
ATTORNEY.

Jan. 7, 1964

B. GOLDBERG 3,117,305

FREQUENCY SHIFT TRANSMISSION SYSTEM

Filed Dec. 2, 1960

3 Sheets-Sheet 3

INVENTOR,
BERNARD GOLDBERG

BY Harry M. Saragovitz

ATTORNEY.

3,117,305

FREQUENCY SHIFT TRANSMISSION SYSTEM

Bernard Goldberg, Wanamassa, N.J., assignor to the United States of America as represented by the Secretary of the Army Filed Dec. 2, 1960, Ser. No. 73,460
6 Claims. (Cl. 340—171)
(Granted under Title 35, U.S. Code (1952), sec. 266)

The invention described herein may be manufactured and used by or for the Government for governmental purposes, without the payment of any royalty thereon.

This invention relates to signal transmission and particularly to binary, digital, and telegraphic communication. More particularly, this invention relates to a form of frequency shift transmission for binary information.

Binary information requires only the establishment of two identifiable states for transmission purposes and hence its use results in the simplest of transmission systems. These systems may be based upon amplitude modulation, frequency modulation, or frequency shift keying. All of these systems are quite satisfactory under normal conditions of operation but all are subject to a common defect which may render reception of the information difficult if not impossible.

When a radio link constitutes a portion of the system the phenomenon of multipath transmission may occur. Waves originating at the transmitter may travel to the receiver over several different paths, and, because of the different lengths of these paths, produce as many separate signals as there are paths. At the point of reception, these signals may be separated in time over an interval that is a substantial portion of—or even greater than—the interval of transmission of one unit of binary information. It can readily be seen that this time separation of received signals can lead to false or contradictory readings of the binary state being transmitted at any particular instant.

One system for nearly maximum effectiveness would involve choosing the signals from one particular path, and eliminating the others. However, for optimum results it may be desirable to coherently combine the signals from several of the paths simultaneously, and sample the resultant. In this case all received energy is usefully employed in making a decision. Last but not least, the system should be able to function accurately in the presence of certain amounts of noise or extraneous signals that are almost inescapable in modern communications.

It is therefore an object of the invention to provide an improved signal transmission system.

It is a further object of this invention to provide an improved system for medium band telegraphic communication.

It is a further object of this invention to provide an improved system for the transmission of binary information.

It is a further object of this invention to provide an improved system that can transmit binary information without suffering from the effects of multipath transmission.

It is a further object of this invention to provide an improved system for the transmission of binary information which discriminates against extraneous signals or noise.

It is a further object of this invention to provide an improved system for the transmission of binary data that can utilize all of the signals available in a multipath transmission.

These and other objects of this invention are accomplished by translating the binary information into either increasing or decreasing variations of a carrier frequency, according to the binary state to be transmitted. After reception, the signals are combined or heterodyned with both increasing and decreasing, local oscillators having the same prescribed pattern or rate of change of frequency as that of the transmitted frequencies, and each having its separate intermediate channel, and detector. Only one of the detectors will be actuated by each of the binary conditions and will reinterpret the correct binary state to the utilization circuit at the receiving station.

This system will be better understood, and other and further objects of this invention will become apparent from the following specification and the drawings, of which:

Figure 1:
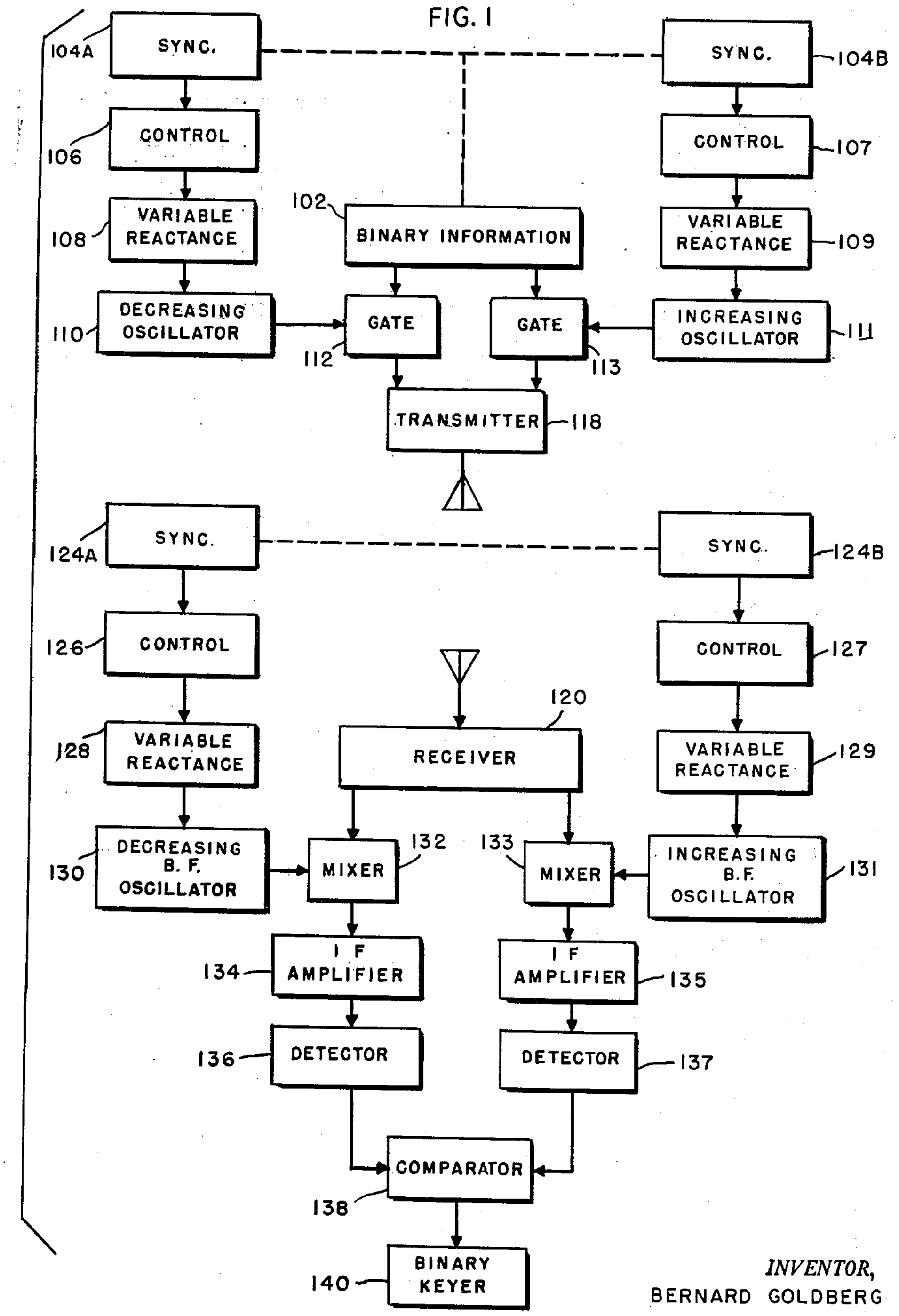
FIGURE 1 shows a block diagram of the circuitry of a preferred embodiment of this invention.

Referring now more particularly to FIGURE 1, a source of binary information 102 is shown. This may be any known prior art device that produces binary information for any purpose, or one that processes or transmits binary information. This binary information is essentially any time-sequential, on or off, mark or space data reduced to a bi-state voltage condition. A typical example of apparatus suitable for element 102 would be a conventional teletype transmitter producing its mark or space output in terms of an on-off output voltage.

The binary information is controlled by, or controls, a synchronizing system comprising elements 104A and 104B. These synchronizing elements may be combined in a single unit and may be a part of the source of binary information 102. It is only of importance that they keep the decreasing and increasing oscillators 110 and 111 in step with the data from the source of binary information. Synchronizing elements 104A and 104B, whether separate elements or combined with the source 102, produce output voltages consisting of trigger pulses synchronized with the switching or transition intervals of the binary information.

The synchronizing system or synchronizing elements couple to the controls 106 and 107 which translate the time information provided by the synchronizing to a saw-tooth waveform or other condition to ultimately vary the frequency of the oscillators. The controls 106 and 107 may be multivibrators or relaxation oscillators of any of the well known circuits that produce a saw-tooth waveform when triggered by input pulses.

The saw-tooth waveforms are applied to variable reactances 108 and 109. These may be reactance tubes or other means of controlling the reactance in a way that can vary the frequency of the oscillators according to a desired pattern. It should be noted that the change in the variable reactances must be in opposite directions or in complementary symmetry with respect to each other, since the required change in frequency of the oscillators must be in the opposite sense over any given interval of time for the correct functioning of this system. A phase inverter circuit may be used to accomplish this reversal of sense.

The oscillators 110 and 111 may be of any of the well known types whose frequency can be varied by external means according to a desired pattern. The oscillator 110 is called a "decreasing" oscillator to distinguish it from the "increasing" oscillator 111. That is to say that the frequency of the oscillator 110 will be decreasing at a desired rate during a given interval while the frequency of the oscillator 111 will be increasing at the desired rate during the same interval. Both oscillators will be restored to their original frequency instantaneously at the end of their respective frequency excursions, which must terminate at the end of each binary pulse interval. Both oscillators are tuned to begin their excursion at, and return to, the same mean or center frequency.

This particular mean or center frequency may be considered the carrier frequency of the system, for comparison with other systems, and the whole range of frequencies of the oscillators 110 and 111 must be within the bandpass range of the transmitter 118. The signals from the oscillators 110 and 111 are passed to the transmitter through the gates 112 and 113, which are actuated by the source of binary information 102. The gates may be actuated in any sequence or in any pattern but one of them must be open for the major portion of each binary information interval, and only one gate may be open at a time. These gates may be of the vacuum tube variety, actuated by a voltage pulse, or they may be any of the well known types of electrically or mechanically actuated switches.

The output circuits of both of the gates are coupled to the transmitter 118, so that whichever of the gates is actuated, the corresponding oscillator frequency will be passed on to the transmitter for radio frequency amplification and transmission. The means for accomplishing this amplification are conventional and will normally be associated with resonant circuits of sufficient bandwidth to accommodate the maximum frequency excursion of both the increasing and the decreasing oscillators.

The receiver 120 is also of a conventional type, and is presumed to have enough gain and bandwidth to receive the signals supplied by the transmitter 118 and to apply them to the mixing circuits 132 and 133 at a sufficient level to allow the system to function properly.

The other signals to be applied to the mixers 132 and 133 are from the local, beat-frequency oscillators 130 and 131. These oscillators are variable in frequency, as are the oscillators 110 and 111, and they may be similarly controlled to provide frequencies that are increasing or decreasing according to the desired pattern. In this case the oscillators are tuned to a frequency higher or lower than that of the original frequency of the oscillators 110 and 111 by an amount equal to the intermediate frequency that is to be used in this system.

The frequencies of the oscillators 130 and 131 are controlled by the variable reactances 128 and 129 according to the same pattern or at the same rate and in the same way as the frequencies of the oscillators 110 and 111 are controlled. The functions of the control elements 126 and 127 for the variable reactances 128 and 129 can be the same as those of the control elements 106 and 107, and the same form of synchronization may be used for all the controls.

Both the transmitter and the receiver sections of this system must be kept synchronized precisely for effective functioning of the system. This can be accomplished in several ways. The synchronizing signals may be supplied by very highly stable oscillators that would have negligible drift over a normal sending interval, or the synchronizing relationship may be maintained through any source of timing signals available to both transmitting and receiving stations. The synchronizing data may also be supplied by the transmitter to the receiver in the form of separate sync pulses, or it may be taken from the data already being transmitted by differentiating the waveforms and other techniques. Such synchronizing techniques being well known in the art and forming no part of the present invention it is not considered necessary to describe the apparatus in detail.

In any case it is essential for the decreasing and the increasing beat-frequency oscillator frequencies to have a precise time relationship as well as a constant frequency relationship with respect to the transmitted oscillator frequencies. As noted earlier, the pattern of change or the rate of change of the frequencies of both of the decreasing oscillators and both of the increasing oscillators must be identical at all times.

The received signal information combines with the beat-frequency oscillator signals in the mixers 132 and 133 to produce intermediate frequency signals. When the gate 112 is being actuated and the decreasing oscillator signal is being transmitted, it will have a constant frequency difference with respect to the decreasing beat-frequency oscillator signal and will produce a constant intermediate frequency which will be passed by the tuned intermediate frequency amplifier 134 to the detector 136, which may be an integrating detector, and which will apply a direct current signal to the comparator 138. The signal from the decreasing oscillator 110 will also mix with the signal from the increasing beat-frequency oscillator 131 but it will produce a rapidly changing intermediate frequency that will coincide with the frequency of the intermediate frequency amplifier 135 only instantaneously or not at all. Consequently, the detector 137 will receive no signal to apply to the comparator 138. The detectors 136 and 137 and comparator 138 may be synchronous in operation and locked to synchronizers 124A and 124B.

When the gate 113 is being actuated and the increasing oscillator frequency is being transmitted, the opposite effect will be had in the receiver, with a signal in the intermediate frequency amplifier 135 and the detector 137 to indicate the opposite condition to the comparator 138.

The comparator 138 senses the signal from one side or the other and passes on this information to the binary keyer 140 which is switched to the appropriate state; positive or negative, or mark or space, whichever the case may be. The binary keyer may operate any desired signal receiving device such as a tape punch.

Figure 2A:
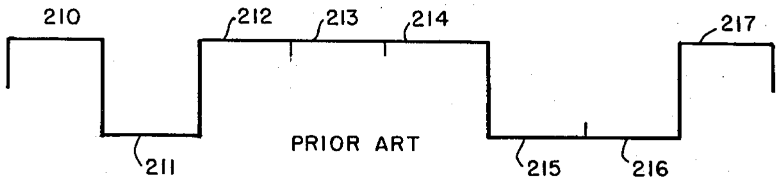
FIGURE 2A illustrates a waveform of a transmitted binary signal typical of the prior art.
Figure 2B:
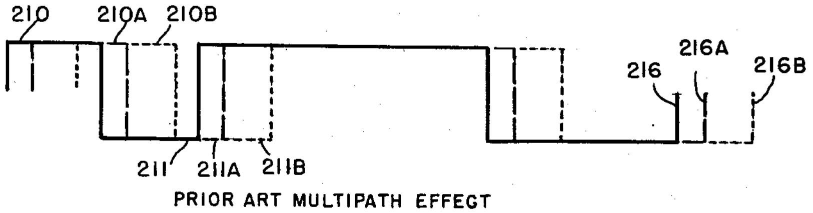
FIGURE 2B illustrates the received waveform and illustrates the effect of multipath transmission.
Figure 3:
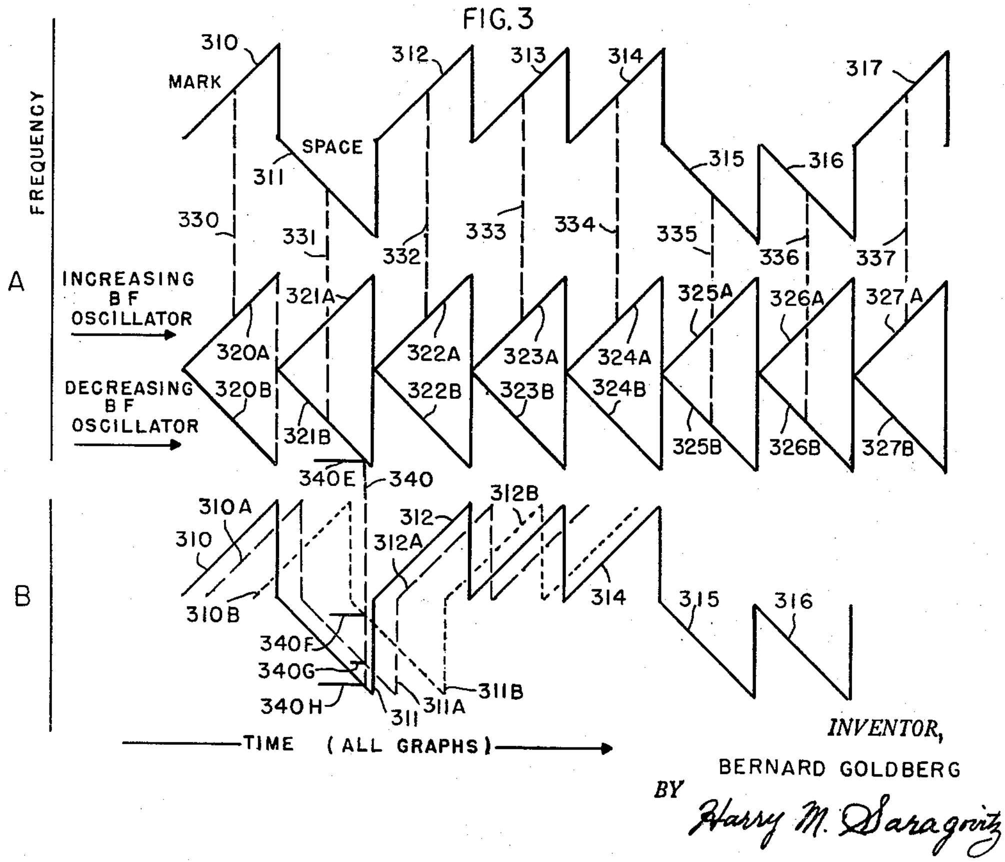
FIGURE 3A illustrates waveforms of a transmitted binary signal typical of this invention.
FIGURE 3B illustrates the corresponding received waveforms.

The comparison of the operation of this system with the operation of other forms of binary transmission is seen in the FIGURES 2 and 3. FIGURES 2A and 2B show the transmission of binary information as amplitude modulated or frequency modulated (frequency shift) signals. The binary intervals in the FIGURES 2A and 2B are 210 through 217, with 210 being a mark, 211 a space, 212 another mark, etc. The vertical axis may represent the frequency shift in this case and the horizontal axis represents the time.

The second and third sets of mark intervals 210A and B, and space intervals, 211A and B in FIGURE 2B, symmetrical to the original signals but displaced along the time axis, are typical of the signals that would be received due to the effects of multipath transmission. These signals, which have been given the same numbers as the original signals with the suffixes A and B, show that the duplicating signals from multipath transmission will reach the receiver after the original signal has arrived. It will be seen from these graphs that the secondary, multipath signals may be delayed for as long as the bniary interval itself, and can completely confuse the detecting and identifying mechanism of the prior art systems.

FIGURES 3A and 3B show the transmission of binary information according to this invention. The reaction of multipath transmissions is seen in the FIGURE 3B. In these curves the vertical axis again represents frequency and the horizontal axes represent time. The time axes are the same in all the figures, and the frequency axes are of the same order of magnitude.

The mark and space intervals 310 through 317 have the same binary sequence as those in FIGURE 2. However, instead of having the rapid shift between two frequency levels seen in FIGURE 2, the frequency in FIGURE 3 is changing constantly throughout the interval. In the mark intervals 310, 312, etc. the frequency is increasing until the termination of the interval, when it returns to its normal level. In the space intervals 311, 315, etc. the frequency is decreasing until the end of the interval, when it returns to its normal level. The change in frequency with respect to time is constant, and the same for both mark and space, in the example shown here, although non-linear rates of frequency change may also be employed.

The mark and space frequency changes are the ones produced by the increasing and decreasing oscillators associated with the transmitter, as selected by the gates controlled by the source of binary information. It is noted that the direction of the frequency change is opposite for each of the two conditions and only one condition is utilized at one time.

In FIGURE 3A the changes in the frequencies of the beat-frequency oscillators are shown with relation to the changes in frequency of the incoming binary information. One oscillator frequency is shown as the curves 320A through 327A and the other oscillator frequency is shown as the curves 320B through 327B.

Since the beat-frequency, or local oscillator curves are shown to scale with respect to the mark and space signals, and are displaced therefrom by an amount that may represent the intermediate frequency, it is clearly seen that the changing frequencies during the mark intervals maintain a constant difference with respect to the changing frequencies of the increasing local oscillator, and that they can be expected to produce a constant frequency signal in the corresponding intermediate amplifier and detector.

It is also clearly seen that the space interval frequency change has a constant relationship with respect to the frequency change of the other, decreasing, local oscillator and that the space signal will produce a signal in the other intermediate frequency amplifier and detector. Neither the space nor the mark signals will produce the required difference frequency with respect to the other local oscillator. This system of transmission utilizes a dynamic change in frequency with respect to time and would be very unlikely to make an error in identifying a signal, or to be affected by a random noise signal.

The manner in which this system overcomes the likelihood of error due to the secondary signals of multipath propagation is seen in the curves of FIGURE 3B. The mark and space sequence in FIGURE 3B is the same as that of the original signals of FIGURE 3A, and have the same numbers. The delayed signals have the same numbers with the suffixes A and B. The delayed signals will be received and will also mix with the local oscillator frequencies, but since the local oscillator frequencies are constantly changing, the intermediate frequency resulting from a delayed signal will be substantially different from the intermediate frequency resulting from the original signal. The intermediate frequency amplifiers 134 and 135 may have enough band-width to accommodate certain slightly delayed signals, but they can completely eliminate signals delayed to the extent that they would give a false reading.

The difference between the intermediate frequencies is illustrated by the intersection 340E through H along the line 340 in the space interval 311 of FIGURE 3B. The typical intermediate frequency spacing between the original signal and the corresponding local oscillator signal is illustrated by the distance between the intersection 340E and 340H. The slight time displacement of the multipath signal 311A reduces this intermediate frequency to an amount corresponding to the distance between 340E and 340G. The considerable delay of the multipath signal 311B reduces the intermediate frequency to an amount corresponding to the distance between 340E and 340F. It is obvious that an intermediate frequency amplifier tuned to a frequency corresponding to the distance between 340E and 340H could probably discriminate against a frequency corresponding to the distance between 340E and 340G, and completely reject a frequency corresponding to the distance between 340E and 340F.

The ability of this circuit to identify a particular one of a series of identical signals that are actually overlapping in the time spectrum makes it possible for this system to provide positive, accurate readings of signals under difficult conditions, particularly with regard to certain types of noise, anomalous interference, and multipath interference. It is also possible with this system to isolate one of the multipath signals that may be stronger or more reliable than the original signal and to discard the others, including the original. This can be done by either delaying the timing of the local oscillator signals, or by changing the relative frequencies of one of the pairs of oscillators.

This invention can realize even greater utility by incorporating within it a technique such as the "Rake" concept that utilizes a delay line to enable continuous sampling to be made of all of the useful signals arriving over a given interval of time. This technique as applied to binary transmission of data is described in an article by Rice and Green entitled "A Communication Technique for Multipath Channels" in the March 1958 issue of the Proceedings of the Institute of Radio Engineers, pages 555–570.

Figure 4:
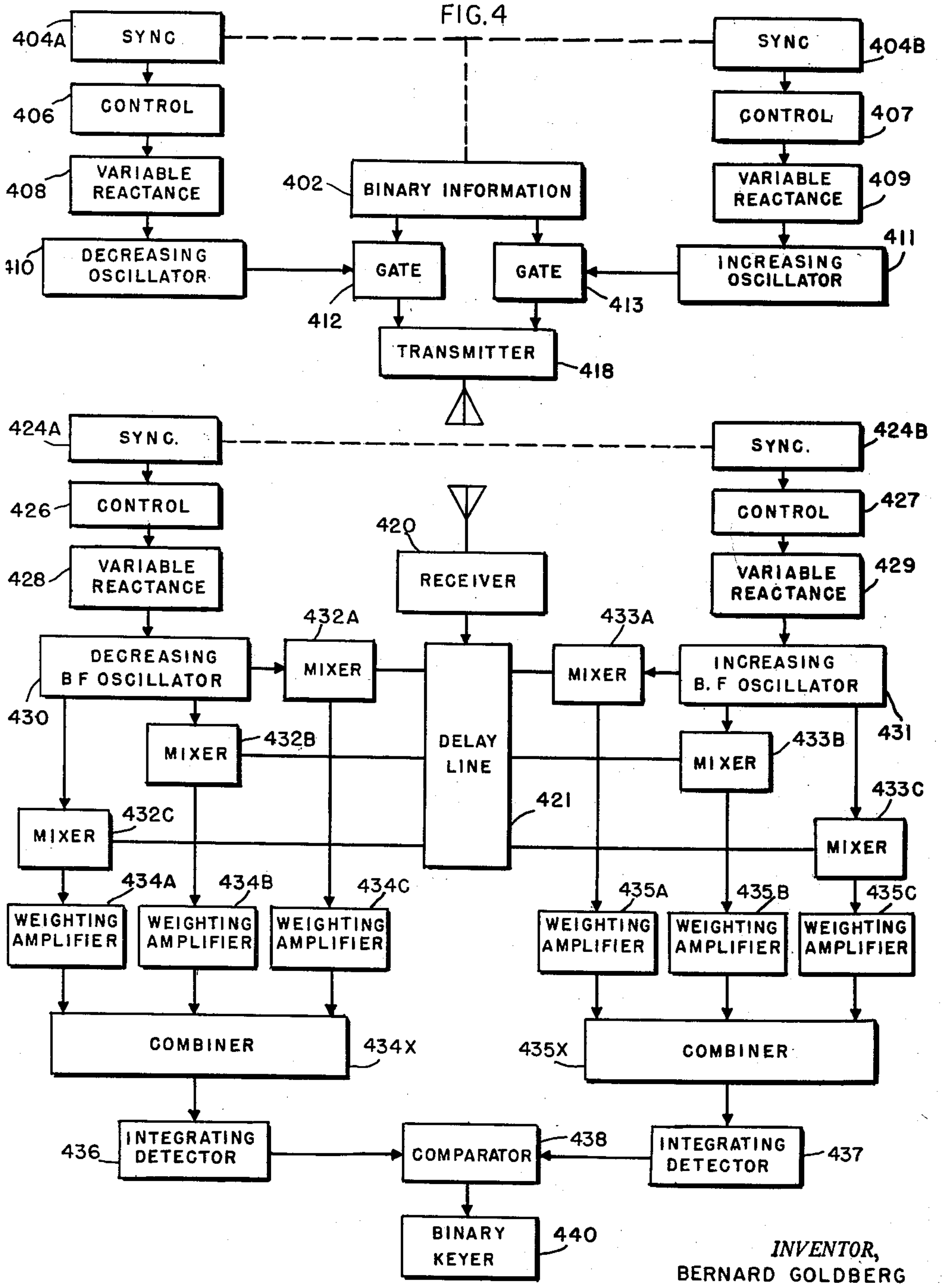
FIGURE 4 shows a block diagram of the circuitry of another species of this invention for the utilization of all of the signals of a multipath transmission.

The "Rake" technique as applied to this invention is shown in FIGURE 4 wherein the transmitting system is similar to that of FIGURE 1 and the receiving system is changed to include the "Rake" techniques. The numbering of the two figures is correlated as much as possible.

In FIGURE 4 the output of the radio receiver 420 is applied to a delay line 421 instead of being applied directly to the mixers as in FIGURE 1. The decreasing and increasing, beat-frequency, local oscillators 430 and 431 are the same as in FIGURE 1, and their respective frequency controls 426 and 427 and synchronization 424A and 424B are the same as in FIGURE 1, but the output of each of these local oscillators 430 and 431 is applied to several mixers instead of just to one mixer. These mixers are coupled to the delay line 421 at successive points to mix with the signals—that had come in at earlier intervals—at the same time it mixes with the latest signal at the beginning of the delay line.

The mixers 432A, 432B and 432C, for example, each sample a distinct and different interval of time along the delay line 421 at the same instant that the single signal from the local oscillator 430 is applied to all of the mixers. The mixers 433A, 433B and 433C do the same for the increasing frequency signals from the local oscillator 431 at the same instant, and cover the same intervals of time along the delay line.

The outputs of the mixers may be further amplified by passing them through weighting amplifiers 434A to C and 435A to C respectively. These amplifiers may be of the type that amplify signals in proportion to their strength to accentuate strong, reliable signals and reduce the effect of weaker signals that may be less reliable. Although only 3 sets of mixers and weighting amplifiers are shown the actual number may be much greater; being only limited by the resolving ability of the delay line tap spacing and the rate and extent of signal frequency change.

The outputs of the weighting amplifiers are combined in common adding circuits 434X or 435X. These combiners sum up all the most useful of the signals sampled along the delay line to provide a highly reliable and accurate indication of the presence of a signal. These signals are detected by either of the integrating detectors 436 or 437 to be applied to the comparator 438, which is similar to the comparator 138 of FIGURE 1, for the decision as to whether a mark or a space shall be applied to the binary keyer 440.

The integrating detectors 436, 437 and comparator 438 may also be coupled to the receiver sync system and gated to further limit the interval during which signals will be effective. This will reduce even more the possibility of interference from unwanted signals.

While the preferred embodiment described here uses electronic control of the oscillator frequency, it will be obvious that any other means of producing identical oscillator frequency changes that can be synchronized will be suitable. For example, a mechanically rotated variable condenser, or other electromechanically varied impedance may be used to vary the frequency of all of the oscillators. Mechanical coupling, and synchronous motors would satisfy the local and remote synchronizing requirements, respectively.

What is claimed is:

1. In a binary data transmission system having constantly changing frequency characteristics wherein mark intervals have an increasing frequency and space intervals have a decreasing frequency with respect to the carrier frequency, means for receiving said mark and space frequencies comprising: a first local oscillator maintaining a constant intermediate frequency relationship with respect to said mark interval frequencies; a first means for heterodyning the constantly-changing, increasing frequency of said mark interval signal with the signal from said first local oscillator; a second local oscillator maintaining said constant intermediate frequency relationship with respect to said space interval frequencies; a second means for heterodyning the constantly-changing, decreasing frequency of said space interval signal with the signal from said second local oscillator; a first intermediate frequency amplifier connected to said first means for heterodyning; a first detector connected to said first intermediate frequency amplifier; a second intermediate frequency amplifier connected to said second means for heterodyning; a second detector connected to said second intermediate frequency amplifier; a comparing circuit connected to said first and second detectors; and a binary keyer connected to said comparing circuit to reproduce the mark and space intervals as binary data.

2. A binary data transmission system having constantly changing frequency characteristics wherein mark intervals have increasing frequency characteristics and space intervals have decreasing frequency characteristics with respect to the carrier frequency comprising: means for receiving said mark and space information; a first local oscillator having increasing frequency characteristics similar to those of said mark interval; a second local oscillator having decreasing frequency characteristics similar to those of said space intervals; both local oscillators providing signals having a constant intermediate frequency difference from their respective mark and space interval frequencies; a first mixer connected to said first local oscillator for mixing said mark interval signals with the signals from said first local oscillator; a second mixer connected to said second local oscillator for mixing said space interval signals with the signals from said second local oscillator; a first intermediate frequency amplifying and detecting means connected to the output of said first mixer; a second intermediate frequency amplifying and detecting means connected to the output of said second mixer; a comparing circuit connected to said first and second intermediate frequency amplifying and detecting means; and a binary keyer connected to said comparing circuit to reproduce the mark and space intervals as binary data.

3. A system for transmitting binary information in one of two states comprising: means for providing an increasing oscillator frequency in response to one of said binary states; means for providing a decreasing oscillator frequency in response to the other of said binary states; means for transmitting said oscillator frequencies; means for receiving said oscillator frequencies; said receiving means including a first local oscillator means having increasing frequency related to the said increasing oscillator frequency; a first mixer connected to said first local oscillator; a second local oscillator means having a decreasing frequency; a second mixer connected to said second local oscillator related to the said decreasing oscillator frequency; a first amplifying and detecting means connected to said first mixer and responsive to the difference between said increasing oscillator frequency and that of said local oscillator; a second amplifying and detecting means connected to said second local oscillator and responsive to the difference between said decreasing oscillator frequency and that of said local oscillator; means for comparing the outputs of said first and second detecting means; and binary keying means, responsive to the output of said comparing means, for reproducing the original binary state.

4. A data transmission system comprising: a source of binary information; a first means for translating one of said binary states into a continuously increasing oscillator frequency; a second means for translating the other of said binary states into a continuously decreasing oscillator frequency; means for transmitting the one of said continuously varying oscillator frequencies, selected by said source of binary information; means for receiving said transmitted signals; a first local oscillator means in said receiving means having a continuously increasing frequency related to that of said first means; a second local oscillator means in said receiving means having a continuously decreasing frequency related to that of said second means; a first mixing, intermediate frequency amplifying and detecting means connected to said first local oscillator; a second mixing, intermediate frequency amplifying, and detecting means connected to said second local oscillator; comparing means connected to said first and second detecting means to determine which of said detecting means is responding to a signal; and a binary keying means connected to said comparing means for producing an appropriate binary signal.

5. A system for transmitting information existing in either one of two states comprising: means for continuously increasing the frequency of an oscillator between a first and a second frequency in response to one of said two states; means for continuously decreasing the frequency of an oscillator between said first and a third frequency in response to the other of said two states; means for transmitting the one of said changing oscillator frequencies corresponding to the existing state; means for receiving said changing oscillator frequencies including, a first local oscillator, means for continuously increasing the frequency of said first local oscillator between a fourth and a fifth frequency, a second local oscillator, means for continuously decreasing the frequency of said second local oscillator between said fourth and a sixth frequency, a first and second mixer, each connected to a corresponding one of said local oscillators, a first and a second intermediate frequency amplifier, each connected to a corresponding one of said mixers, said intermediate frequency amplifiers responsive to the difference between said first and said fourth frequencies, said second and fifth frequencies, and said third and sixth frequencies, a first and second detector each connected to a corresponding one of said first and second intermediate frequency amplifiers; a comparator connected to said first and said second detectors; and a two state keyer connected to said comparator to reproduce said existing state.

6. A data transmission system comprising: a source of binary information; means for translating one of said binary states into a continuously increasing frequency; means for translating the other of said binary states into a continuously decreasing frequency; means for transmitting the existing one of said continuously varying frequencies, means for receiving the existing one of said continuously varying frequencies; a first local oscillator having a constant difference from said continuously increasing frequency, a second local oscillator having a constant difference from said continuously decreasing frequency; a plurality of mixers connected to each of said local oscillators; a delay line connected to the input of said means for receiving, and having a plurality of output connections, representing different time intervals, each connected to one of said mixers; a plurality of intermediate frequency amplifiers, tuned to the difference between said continuously varying frequencies and the corresponding frequencies of one of said local oscillators, each connected to one of said mixers; a first combiner connected to all of the intermediate frequency amplifiers corresponding to the increasing frequency local oscillators; a first detector connected to said first combiner, a second combiner connected to all of the intermediate frequency amplifiers corresponding to the decreasing frequency local oscillator; a second detector connected to said second combiner, a comparing circuit connected to said first and said second detectors; and a binary keyer connected to said comparing circuit to reproduce the existing binary state.

References Cited in the file of this patent

UNITED STATES PATENTS 2,839,604 Shank ------------------ June 17, 1958

UNITED STATES PATENT OFFICE

CERTIFICATE OF CORRECTION

Patent No. 3,117,305 January 7, 1964

Bernard Goldberg

It is hereby certified that error appears in the above numbered patent requiring correction and that the said Letters Patent should read as corrected below.

Column 7, lines 73 and 74, strike out "a second mixer connected to said second local oscillator"; lines 74 and 75, after "frequency;" insert -- a second mixer connected to said second local oscillator --; column 8, line 4, for "local oscillator" read -- mixer --.

Signed and sealed this 7th day of July 1964.

(SEAL)
Attest:

ERNEST W. SWIDER
Attesting Officer

EDWARD J. BRENNER
Commissioner of Patents